United States Patent
Curtwright et al.

[19]

[11] Patent Number: 5,884,219
[45] Date of Patent: Mar. 16, 1999

[54] MOVING MAP NAVIGATION SYSTEM

[75] Inventors: William Ames Curtwright; Edwin E. Parks, both of Salem, Oreg.

[73] Assignee: Ames Maps L.L.C., Sale, Oreg.

[21] Appl. No.: 728,617

[22] Filed: Oct. 10, 1996

[51] Int. Cl.[6] .................................................. G06F 165/00
[52] U.S. Cl. .......................... 701/213; 701/208; 340/990; 340/995
[58] Field of Search .................................... 701/200, 202, 701/206, 207, 208, 213; 73/178 R; 340/988, 990, 995

[56] References Cited

U.S. PATENT DOCUMENTS

| | | | |
|---|---|---|---|
| 4,400,727 | 8/1983 | Aron | 358/103 |
| 4,470,119 | 9/1984 | Hasebe et al. | 364/449 |
| 4,484,192 | 11/1984 | Seitz et al. | 340/995 |
| 4,513,377 | 4/1985 | Hasebe et al. | 364/449 |
| 4,571,684 | 2/1986 | Takanabe et al. | 364/449 |
| 4,675,676 | 6/1987 | Takanabe et al. | 340/995 |
| 4,737,916 | 4/1988 | Ogawa et al. | 364/443 |
| 4,737,927 | 4/1988 | Hanabusa et al. | 364/443 |
| 4,796,190 | 1/1989 | Cummings | 701/200 |
| 4,847,788 | 7/1989 | Shimada | 364/522 |
| 5,059,970 | 10/1991 | Raubenheimer et al. | 701/208 |
| 5,067,081 | 11/1991 | Person | 701/202 |
| 5,115,399 | 5/1992 | Nimura et al. | 364/449 |
| 5,283,562 | 2/1994 | Kaneko et al. | 345/131 |
| 5,341,463 | 8/1994 | Wescott et al. | 395/129 |
| 5,369,735 | 11/1994 | Thier et al. | 395/123 |
| 5,465,323 | 11/1995 | Mallet | 395/123 |
| 5,519,392 | 5/1996 | Oder et al. | 701/207 |
| 5,543,802 | 8/1996 | Villevieille et al. | 701/206 |
| 5,559,707 | 9/1996 | DeLorme et al. | 701/200 |
| 5,696,684 | 12/1997 | Ueberschaer | 340/990 |

FOREIGN PATENT DOCUMENTS

| | | |
|---|---|---|
| 0452613 A2 | 10/1991 | European Pat. Off. . |
| 0534755 A2 | 3/1993 | European Pat. Off. . |
| 0539143 A2 | 4/1993 | European Pat. Off. . |
| 0539145 A1 | 4/1993 | European Pat. Off. . |
| 0539146 A2 | 4/1993 | European Pat. Off. . |
| 0559355 A1 | 9/1993 | European Pat. Off. . |
| 0601712 A1 | 6/1994 | European Pat. Off. . |

OTHER PUBLICATIONS

*Adobe Photoshop Version 2.5 for Windows User Guide,* 1993 Adobe Systems Incorporated, pp.79–90.

Foley, James D. et al., *Second Edition Computer Graphics Principles and Practice,* Addison–Wesley Publishing Company, Inc. 1991, pp. 9–13.

*Primary Examiner*—Gary Chin
*Attorney, Agent, or Firm*—Klarquist Sparkman Campbell Leigh & Whinston, LLP

[57] ABSTRACT

A navigation system includes a processor and bit-mapped earth surface map image data in a first data storage device accessed by the processor, the processor displaying an image essentially filling a display area of a display screen and centered on any latitude and longitude supplied to the processor, the image having no discontinuities. The processor may receive latitude and longitude inputs from a user via a user input device, or from a global positioning system (GPS) receiver incorporated in the navigation system. The displayed map image may thus be centered at a desired longitude and latitude or at the longitude and latitude of the navigation system itself. The system may include a second data storage device for storing data from and providing data to the processor. Route information such as flight plan data may then be stored in the second data storage device. Information relating to the type of map system displayed and the scale at which it is displayed, to the currently displayed longitude and latitude, and other significant information is always displayed with the displayed map image. Other information is selectably displayed at a peripheral portion of the display area. Overlays may be selectably displayed over the bit-mapped map image display, with corresponding features appropriately aligned. Such overlays may include approach overlays and instrument flight rules route charts.

24 Claims, 6 Drawing Sheets

| LEG | FROM | TO | DISTANCE | HEADING |
|---|---|---|---|---|
| LEG NO. | | | | |
| LEG NO. | ICAOI ID | ICAO ID | DISTANCE | HEADING |
| | NAME | | | |
| LEG NO. | | | | |
| START POINT | | DESTINATION | | TOTAL DISTANCE |
| PLAN NO. | | PLAN NAME | | NO. WAYPOINTS |

# MOVING MAP NAVIGATION SYSTEM

FIELD OF THE INVENTION

This invention relates generally to navigation systems, and more particularly to a portable navigation system capable of displaying map information stored in a unique format, and capable of storing and displaying information relating to particular facilities such as airports in the vicinity of the location of the navigation system or in the vicinity of any location selected relative to the stored map information, and capable of displaying such information in conjunction with, and at least in part simultaneously with, a relevant portion of the stored map information.

BACKGROUND OF THE INVENTION

Navigation systems that can generate and display geographic map images are now available. Typically a navigation system that displays map images includes a computer or processor that has stored within its associated memory system, such as in secondary storage, data corresponding to the map images, or data from which the map images may be derived. The map image data, if stored as bit maps, may be retrieved and essentially directly displayed. The map image data may also be stored in another form, such as vector graphic data, from which the computer system may generate a map image.

One increasingly popular use of such navigation systems is for installation in mobile vehicles such as automobiles. Such navigation systems are then provided with a position sensing device, so that the appropriate map image can be selected based on the position of the automobile, so that the position of the automobile may be displayed on the map.

One drawback of common navigation systems is the poor quality of the map images they display. In systems that generate map images from data such as vector graphics data, the detail of the map image is generally sparse. Only objects that are specifically recorded in the data are displayed. While highly detailed vector graphics images are achievable, substantial processing power is required to generate detailed images with the necessary speed, particularly for real-time display of position-dependent map images, requiring expensive and/or specialized processors and/or taking processor time away from other functions that the navigation system might otherwise perform. On the other hand, systems that store detailed map images as bit maps do not store the images in a uniform format. Without a uniform format, the bit mapped images have varying size and distortion factors, making it difficult to accurately determine and display a given location on the map image. The varying size also leaves gaps on the screen as one image is replaced by another. Bit-mapped images also tend not to scale well, providing poor image quality at extremes of viewing scale.

Another drawback of common navigation systems is lack of portability. Navigation systems generally are installed in vehicles such as automobiles. The system cannot be easily removed and placed in another vehicle or carried to another location, and generally do not provide a self-contained power supply for stand-alone operation.

Another problem faced by navigation systems is that of providing a desired level of detailed information in straightforward, easily comprehensible format. Overly crowded graphics images that include too much information can be confusing to the user of the navigation system.

Another problem faced by navigation systems is that of providing a convenient and useful method of moving around the map independently of tracking the position of the navigation system. A simple method of moving to desired portions of a map is needed.

Another problem faced by navigation systems is cost. A navigation system with good performance at reasonable cost is desirable.

A problem faced generally by navigation systems used in aeronautics is that while such information as flight paths, approach vectors, beacon locations and the like may easily be represented in vector graphics, the vector graphics engines used for such displays cannot easily represent the high level of detail and wealth of information provided by an aeronautical chart.

An object of the invention, therefore, is to provide a navigation system displaying improved aeronautical and other map images stored in a unique format, and providing useful information to the user in a straightforward, easily comprehensible format, with easy methods of moving around within the map images, all at reasonable cost such that both a portable navigation system and a vehicle-installed navigation system becomes practical. These and other objects of the invention will become more apparent from the following detailed description of the preferred embodiment.

SUMMARY OF THE INVENTION

A navigation system includes a processor and bit-mapped earth surface map image data in a first data storage device accessed by the processor, the processor displaying an image essentially filling a display area of a display screen and centered on any latitude and longitude supplied to the processor, the image having no discontinuities. The processor may receive latitude and longitude inputs from a user via a user input device, or from a global positioning system (GPS) receiver incorporated in the navigation system. The displayed map image may thus be centered at a desired longitude and latitude or at the longitude and latitude of the navigation system itself. The system may include a second data storage device for storing data from and providing data to the processor. Route information such as flight plan data may then be stored in the second data storage device Information relating to the type of map system displayed and the scale at which it is displayed, to the currently displayed longitude and latitude, and other very significant information is always displayed with the displayed map image. Other information, such as information relating to the nearest airport, the GPS receiver status, navigation information from the GPS receiver, and flight plan information may be selectably displayed at a peripheral portion of the display area.

Overlays may be selectably displayed over the bit-mapped map image display, such as overlays of information or charts with corresponding features appropriately aligned. Chart overlays may include approach overlays and instrument flight rules route charts.

DETAILED DESCRIPTION OF A PREFERRED EMBODIMENT

Figure 1:
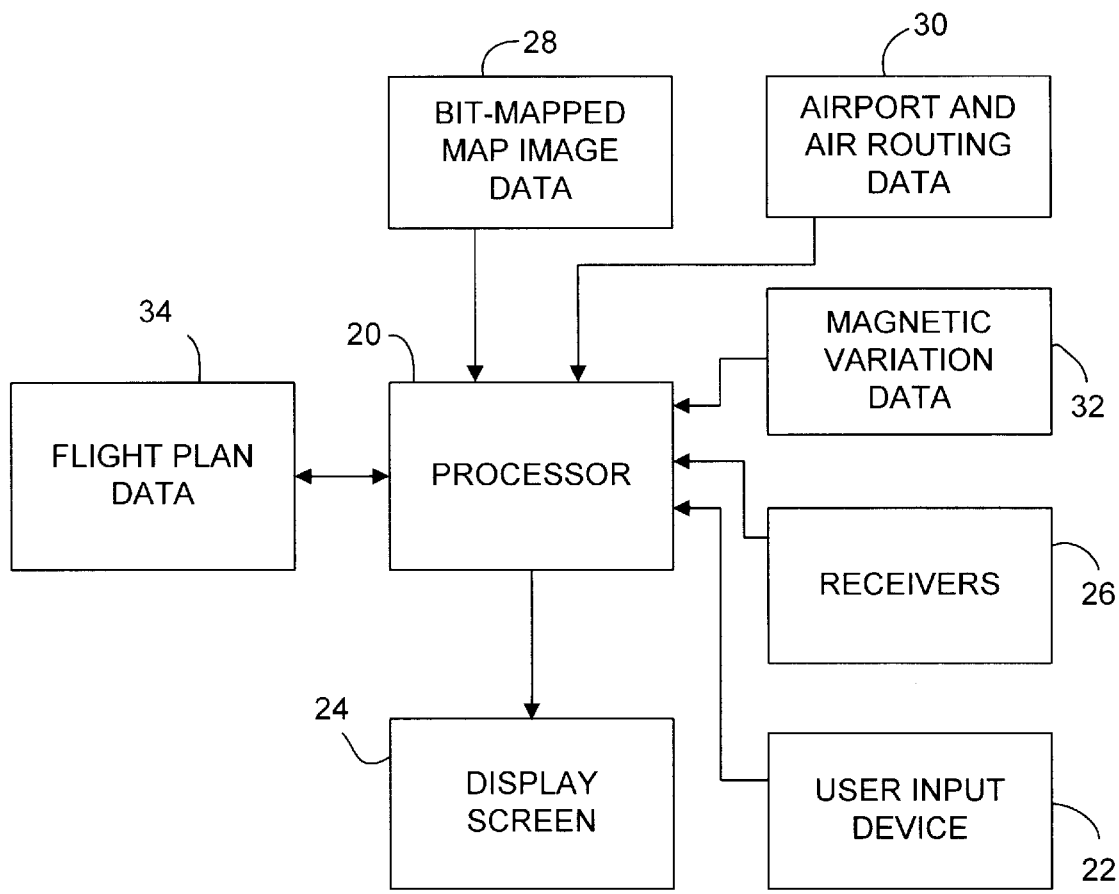
FIG. 1 is a diagram of a generally preferred arrangement of components of an embodiment of a system of the present invention.

FIG. 1 shows a diagram of a presently preferred structure and arrangement for implementing a system according to the present invention. A processor 20 is connected to a data storage device or various date storage devices so as to receive data therefrom. Data stored for access by the processor 20 includes bit-mapped map image data 28, and preferably includes airport and air routing data 30 and magnetic variation data 32. These and other types of data may be organized in any desirable configuration for facilitating the operation of a navigation system of the present invention as described below. The data storage device used to hold the bit-mapped map image data 28 is presently preferred to be a CD-ROM. Read/write devices may also be employed, however, and portions of the bit-mapped map image data 28 are preferably temporarily retained or cached in other data storage devices for faster access as desired.

Processor 20 is also connected to a data storage device so as to be able to store and retrieve data therefrom. Such a data storage device is presently preferred to be RAM or magnetic media or a combination thereof, or other similar memory. Flight plan data 34 is stored in such a device. Data such as flight plan data 34 is preferably preserved during loss of power. This may be accomplished by battery backed RAM, routine storage to a magnetic media, or other techniques as desired.

The processor 20 is also connected to a display screen 24 for displaying map images and information to a user, and to at least one user input device 22 such as a keyboard, keypad, touchscreen, mouse, or the like to allow user input.

Processor 20 is also connected to a global positioning system (GPS) receiver 26 for receiving global positioning information.

Figure 2:
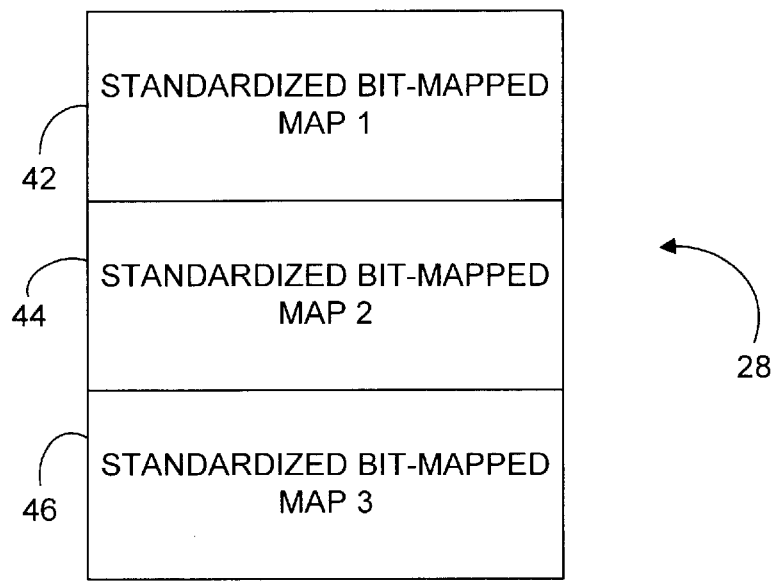
FIG. 2 is a diagram of the presently preferred contents of an element of the diagram of FIG. 1.

The bit-mapped map image data 28 includes bit-mapped map image data of at least one map system, and preferably includes data of a plurality of map systems of mutually differing resolutions, such as map systems data 42, 44, and 46 shown in FIG. 2. The bit-mapped map image data is produced for a given map system by scanning the maps of the map system according to the procedure outlined in U.S. patent application Ser. No. 08/767,319 filed on Dec. 16, 1996 which is a continuation of application Ser. No. 08/432, 992 filed May 2, 1995 and incorporated herein by reference. Briefly stated, the scanning and image modification procedures disclosed in the above application allow standardization of bit-mapped image data for an entire map system, such that the processor 20 may use the data to display a bit-mapped map image centered at any latitude and longitude input to the processor, if within the map system, such that the map image essentially fills the display screen and contains no discontinuities except at the boundaries of the map system, if any. The map systems included in the presently preferred navigation system preferably include such systems as NOAA's world aeronautical charts, NOAA's sectional aeronautical charts, and the Defense Mapping Agency's world maps and the like.

Figure 3:
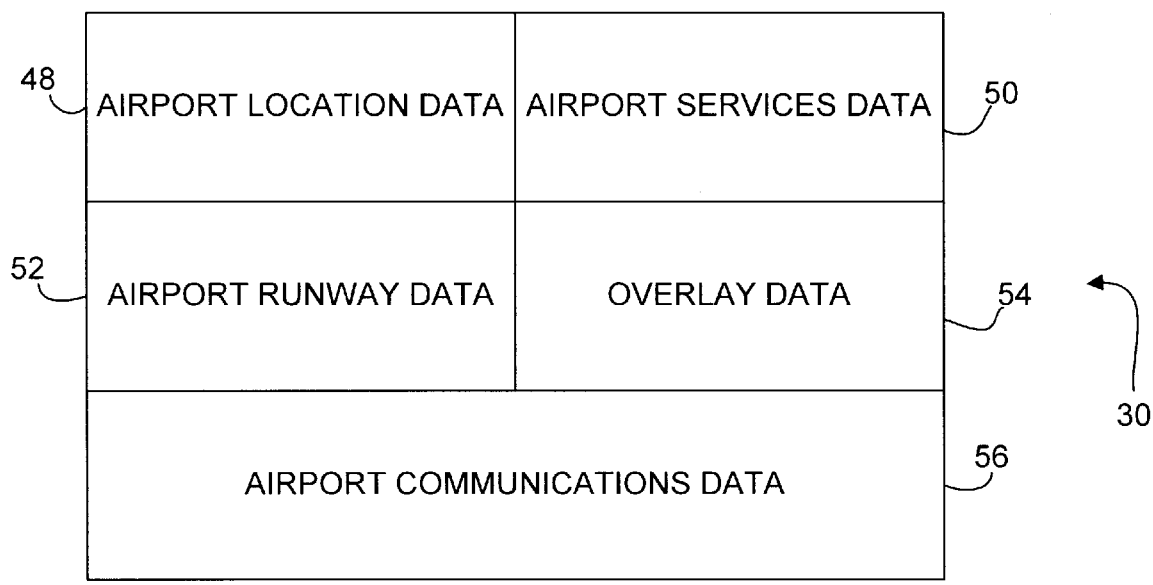
FIG. 3 is a diagram of the presently preferred contents of another element of the diagram of FIG. 1.

As shown in FIG. 3, the airport and air routing data 30 preferably includes airport location data 48, airport runway data 52, airport services data 50, airport communications data 56, and various types of overlay data 54. Overlay data 54 preferably includes approach templates, instrument route charts, and other useful information in graphical or other form.

Figure 4:
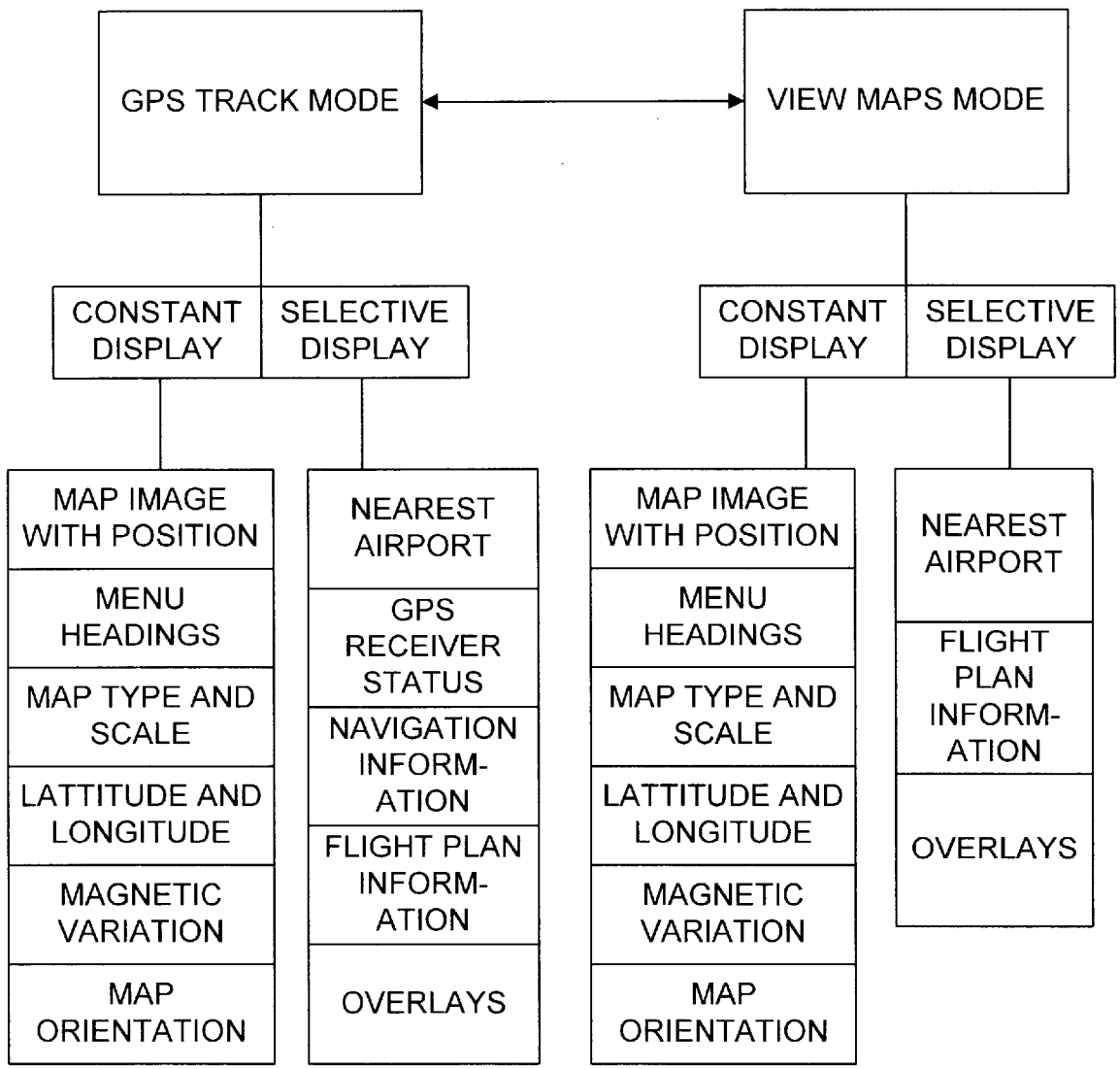
FIG. 4 is a diagram representing a portion of the presently preferred display and command hierarchy of an embodiment of a system of the present invention.

In operation, the navigation system of FIG. 1 is operable in two main modes, a GPS track mode and a view maps mode as illustrated in FIG. 4. In either mode, the processor 20 uses the bit-mapped map image data 28 to display a bit-mapped map image from a selected map system, with the map image essentially filling the display screen 24 and centered at a latitude and longitude supplied to the processor. In the GPS track mode, the latitude and longitude are supplied to the processor by the GPS receiver 26, so that the displayed map image is centered at the position of the navigation system as sensed by the GPS receiver 26. In the view maps mode, the latitude and longitude are supplied to the processor 20 by the user directly through the user input device 22 or from other data such as the airport and air routing data, as selected by the user through the user input device 22.

In either the GPS track mode or the view maps mode, the processor updates the displayed image each time it receives a new latitude and longitude. Thus if the navigation system is moving, the latitude and longitude sensed by the GPS receiver changes periodically, and the map image is updated, giving the appearance of a single continuously scrolling map image moving across the surface of the display area of the display screen.

The features displayed on the display screen in either GPS track mode or view maps mode may be divided into constant display features which are always shown on the screen and selective display features which are selectively shown on the screen in response to user inputs through the user input device.

In either GPS track mode or view maps mode, the preferred constant display features include the map image with a pointer or icon showing the position of the navigation system. The map image preferably is displayed over essentially the entire surface of the display area of the display screen, with the other constant display features occupying the relatively small remaining area. The icon is preferably an airplane, and may if desired be made to point along the displayed map image in the direction of the ground track as sensed by the GPS receiver.

Other constant display features include menu headings in a menu bar, a map type and scale or zoom level window, a longitude and latitude window for displaying the current longitude and latitude of the pointer, a magnetic variation indicator to indicate when magnetic variation compensation is in use, and a map orientation indicator to indicate whether North-up or South-up map image orientation is in use.

Selective display features which are displayed selectively according to user inputs through the user input device include a nearest airport window, a GPS receiver status window, a navigation information window, and a flight plan information window, and various types of overlay. In the view maps mode, the selective display features do not include the GPS receiver status and the navigation information windows, as illustrated in FIG. 4.

Figures 10, 11:
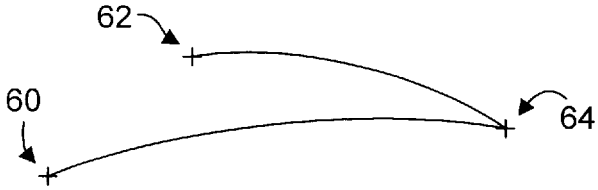
FIG. 10 is a diagram of still another portion of the presently preferred command hierarchy of an embodiment of a system of the present invention.
FIG. 11 is a diagram showing yet another presently preferred display configuration of an embodiment of a system of the present invention.

The window-type selective display features (all those except the overlay feature) are preferably displayed overlaying a peripheral portion of the bit-mapped map image. A currently preferred arrangement is shown for example in FIG. 11. FIG. 11 represents the display area of a display screen. The bit-mapped map image occupies essentially all of the display area of the display screen, but with the four window-type selective display features overlaying the bit-mapped map image at the right peripheral edge thereof. Each of selective display features is individually selectively displayable. All may be displayed together as shown in FIG. 11, or any combination, or none, may be displayed, as selected by user inputs through the user input device.

When a route such as a flight plan is entered into the navigation system and selected, the great circle routes between waypoints along the route may be displayed on the bit-mapped map images. When in GPS tracking mode, the current position of the navigation system is also shown, an the great circle route from the current position to the next waypoint may also be displayed. Such a display is shown schematically on the bit-mapped map image area in FIG. 11. A great circle route is shown graphically by a line overlaid on the display between waypoints 60 and 64. The actual position of the navigation system is shown by pointer 62, and the great circle route from the actual position to the next waypoint 64 is also shown by a line overlaid on the display.

These preferred display arrangements provide particular advantages in that the most basic and important information is always displayed, but is limited to a small, peripheral area of the display area, allowing a relatively large viewing area for the map image. Other important, but more detailed, information is displayed in windows that are somewhat larger, but still peripherally located, and which can be closed, when desired. This provides ease of viewing and comprehending the data presented on the viewing surface of the display screen.

The overlay feature is not displayed in a particular location on the display area of the display screen. Instead, the overlay feature uses air routing data or other information to overlay various types of charts or information on the displayed map image in such a manner that the overlaid features correspond in size, position, and orientation to the features of the bit-mapped map image. Preferred charts for use with the overlay feature include approach templates for airports and instrument flight rules route charts. Such charts may be formatted in the air routing data as bit-mapped or vector graphics images, as desired. A special feature that improves the viewability of the overlaid information is that the bit-mapped map image may be dimmed while the overlaid information remains bright.

The use of bit-mapped map images for the maps displayed in the navigation system of the present invention, rather than raster graphics generated map images, allows quick access to the various images and low processing overhead to display and move the images. This enables the present system to be implemented with low cost processors, and to display moving map images quickly and accurately, with real-time display of the actual position of even a fast-moving vehicle such as an airplane. In one presently preferred embodiment, the present system is embodied in a laptop computer with a CD-ROM drive for the first storage device and a hard drive and RAM for the second storage device. A PCMIA-socket GPS receiver is employed, and the entire unit is then portable and, with batteries, cordless. The keyboard and other input devices of the laptop serve as the user input device. Processor power freed by the use of bit-mapped images is used instead to perform various other functions relating to the display of useful information along with the map images.

The use of bit-mapped map images also allows the inclusion of many more details than can practically be included in a vector-mapped graphics data base. The wealth of detail on the bit-mapped map images is provided without large processing power cost. When these images are combined with chart or other overlays, pilots are provided with more information than with other navigational systems.

Figures 5, 6, 7:
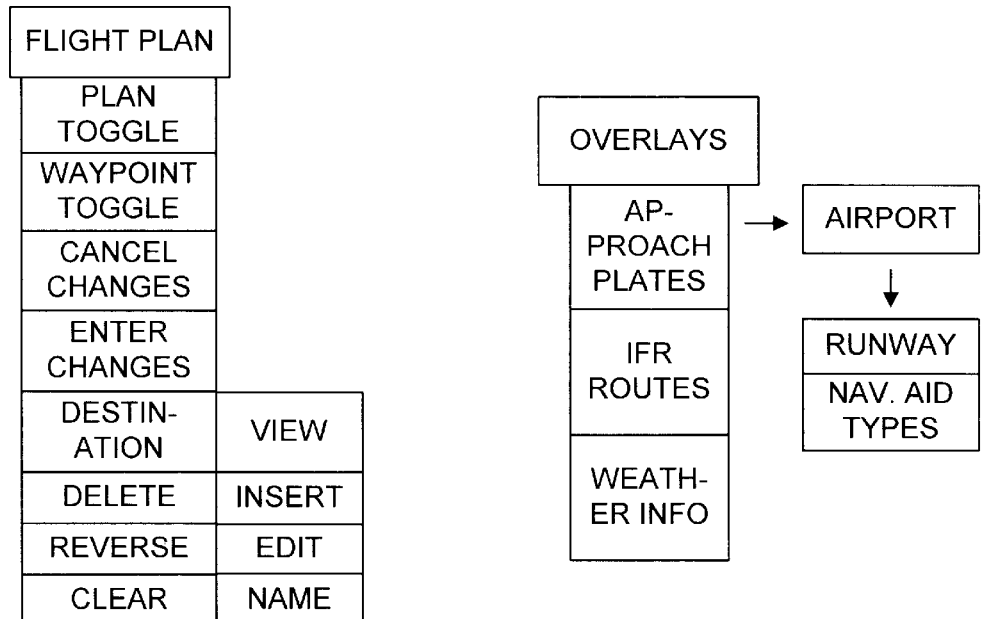
FIG. 5 is a diagram representing another portion of the presently preferred command hierarchy of an embodiment of a system of the present invention.
FIG. 6 is a diagram representing yet another portion of the presently preferred command hierarchy of an embodiment of a system of the present invention.
FIG. 7 is a diagram representing still another portion of the presently preferred command hierarchy of an embodiment of a system of the present invention.

Preferred command hierarchies for an embodiment of a navigation system of the present invention are shown in FIGS. 5–7. In FIG. 5, preferred commands under each of the main menu headings are shown.

Under Options, Exit exits the navigation system (for use when running on a laptop or other general purpose computer), Units allows a selection of the units of measure used in the various displays. Magnetic Variation toggles on and off the magnetic variation compensation. Reset GPS resets the GPS receiver. Switch Mode toggles between GPS tracking mode and view maps mode.

Under Map, Change CD allows a CD containing bit-mapped map image data and other data to be changed for another. North/South Up toggles the orientation of the map images displayed. Auto Orientation provides an orientation with South-up if and only if the ground track (the direction of travel relative to the ground) is southward, otherwise a North-up orientation is provided. Map 1, Map 2, and Map 3 change the map system from which the currently displayed bit-mapped map image is sourced to the map system selected. Overlay calls the overlay commands shown in FIG. 6.

As shown in FIG. 6, Approach Plates or IFR Routes may be selected. Other useful types of information may also be included as additional selections. If Approach Plates is selected, the desired approach plate is preferably selected by first selecting an airport, then a runway at the selected airport. The runway may be selected by number or other designation by the Runway command, or by the types of navigation aid available by the Nav. Aid Types command. The appropriate approach plate is then overlaid on the displayed bit-mapped map image with corresponding features in proper alignment.

Returning to the command hierarchy of FIG. 5, the Zoom commands allow zooming within a given map system. In and Out zoom one level in and out, respectively. The Level choices zoom directly to the indicated zoom level.

The Goto commands allow motion around the map apart from GPS tracking and, when executed, automatically cause a switch to view maps mode. Latitude/Longitude allows entry of the latitude and longitude of the position to which the pointer will move. Airport allows selection of an airport by an official identifier (preferably by ICAO identifier) then moves the pointer to the selected airport. Nearest airport moves the pointer to the nearest airport, while the choices numbered 1–5 move the pointer to the selected one of the five next nearest airports.

The Info command allows selection of an airport as with the Goto commands, but the destination airport (the destination of a currently selected flight plan) is an additional choice. Choice of an airport under the Info command results in display of the information screen or information mode shown in FIG. 9, and in the further command hierarchy shown in FIG. 10. The information screen shown in FIG. 9 includes an airport information window containing information about the selected airport, a runway information window containing information about a selected runway at the selected airport, and a communications information/runway sketch window, containing either information about a selected communications channel of the selected airport, or a sketch of the runways of the selected airport.

The airport information provided in the airport information window is preferably thorough and detailed, including such information as ownership status (civil, military, civil/military, or private), name, City, State, Country, reference longitude and latitude and elevation, magnetic variation, longest runway length and surface type, above ground height for the airport traffic pattern, services and supplies available such as oxygen types, fuel types, repair types, IFR capability, etc., and the airport record date.

The runway information provided in the runway information window is preferably similarly detailed, including such things as the runway identifier, the runway longitude and latitude, the length and width of the runway, the true and magnetic bearings of the runway, the surface type, the lighting type, and the direction of turns for traffic flow. The runway sketch, when shown, gives a representation of the runways with true north up, the runway identifiers displayed near each runway, and the selected runway highlighted.

The communications information, when shown, provides details concerning the communications frequencies of the selected airport, including the number of channels, their call signs, types, and frequencies, and any services provided by or on each frequency.

The command hierarchy shown in FIG. 10 is used to control the display of the information screen. Exit exits the information screen. Airport allows a different airport to be selected. The selections under Communications allow the communications frequencies to be displayed (Show) and allow toggling to the Next or to the Previous frequency. The selections under Runway allow the runway diagram to be displayed (Show) and allow toggling to the Next or to the Previous runway.

Returning to the hierarchy shown in FIG. 5, the selections under Plan allow modifications to the current flight plan. Add Waypoint allows a waypoint to be added after the current point. Add Destination allows a destination to be added at the end of the current plan. Remove Waypoint removes the current waypoint. Next Waypoint and Previous Waypoint toggle to the next and previous waypoints respectively. Plan Display toggles open and closed the flight plan information window shown in FIG. 11. Virtual Flight causes the bit-mapped map image display to track through the current flight plan, employing and displaying the great circle route between waypoints. Flight Plan brings up a command list like that of FIG. 7 and a display as shown in FIG. 8.

Figures 8, 9:
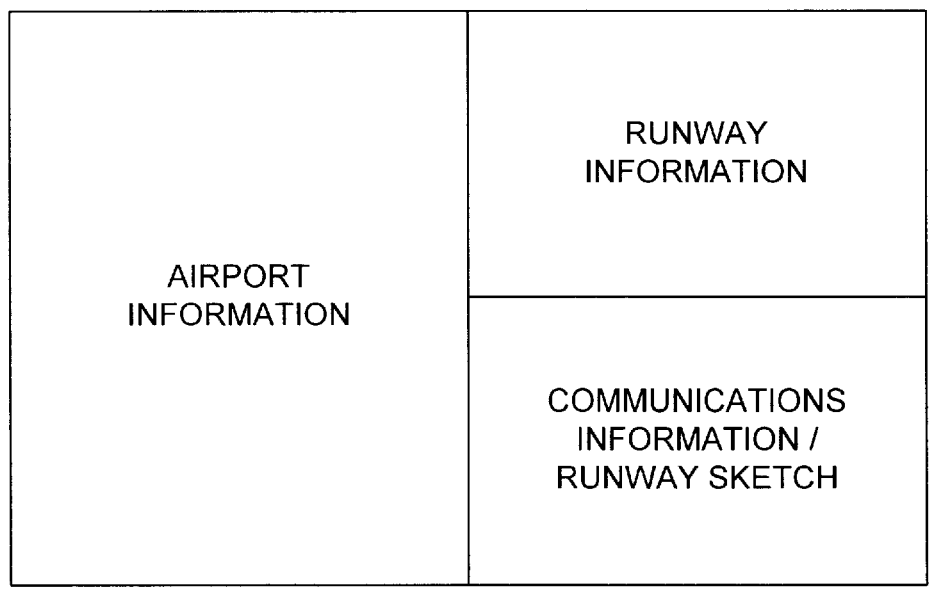
FIG. 8 is a diagram representing a portion of a presently preferred display configuration of an embodiment of a system of the present invention.
FIG. 9 is a diagram showing another portion of a presently preferred display configuration of and embodiment of a system of the present invention.

The preferred flight plan display represented in FIG. 8 is a window having column headings across the top of "leg," "from," "to," "distance," and "heading." Multiple (preferably at least three) legs of the flight plan are preferably displayed under these headings. The layout of information on the middle leg is shown, with the top and bottom legs omitted for clarity. The leg information includes the ICAO identifiers of the waypoints, and the distance and heading from the "from" way point to the "to" waypoint. Under the ICAO identifiers is displayed the name of the "to" waypoint.

Below the plan leg information is a display of the startpoint of the plan, the destination of the plan, and the total distance of the plan. Below that is a display of the plan number and name, and the total number of waypoints in the plan.

The commands in the list in FIG. 7 allow manipulation of the data stored as flight plans and displayed as shown in FIG. 8. Plan Toggle toggles up or down to other plans. Waypoint Toggle toggles up or down to other legs within a plan, with the selected leg highlighted. Cancel changes allows canceling all of current editing performed on a flight plan. Enter causes the changes in the currently edited flight plan to be stored, replacing the previous version. Destination adds a destination to the end of the currently displayed flight plan. Delete deletes a currently highlighted leg of a flight plan. Insert inserts a new leg after the currently highlighted leg of the flight plan. Reverse reverses the current flight plan. Clear clears the current flight plan from the second memory device. Edit allows editing of the highlighted leg of the flight plan. Name allows giving of or editing of a name for the current flight plan. View forces the map image display into view maps mode and places the pointer at the location of the highlighted waypoint or destination.

In view of the many possible embodiments in which the present invention may be implemented, it should be recognized that the illustrated embodiment above is only a preferred example of the invention and should not be taken as a limitation on the scope of the invention. Rather, the invention is defined by the following claims. We therefore claim as our invention all such embodiments as come within the scope and spirit of these claims.

We claim:

1. A method of providing a moving map for use in a navigation system, the method comprising:

(a) providing a processor;

(b) storing first data in a computer storage medium for access by the processor, the first data including standardized bit-mapped map image of at least one map system of at least a portion of the surface of the earth, said first data is generated and stored by (i) electronically scanning a printed map to create a stored bit-mapped map image corresponding to the printed map;

(ii) displaying the stored bit-mapped map image for editing;

(iii) cropping with image editing software the displayed bit-mapped map image into smaller images that are then deleted, moved, sized, and merged back into the displayed image to remove an unwanted part of the image and to select the remainder as a map image corresponding to a desired geographic area, the map image having discrete boundaries defined by reference grid lines;

(iv) moving the boundaries of the displayed map image with said image editing software to shape the geographic area into a predetermined rectangular shape;

(v) sizing the displayed map image with said image editing software after the image has been shaped to contain a predetermined pixel area;

(vi) permanently storing, in the computer storage medium, the displayed map image as a bit-mapped map image of the printed map after the displayed image has been shaped and sized, the displayed map image being stored with an identifier of a reference point and size of the geographic area represented by the selected map image; and (vii) repeating (i)–(vi) to create a plurality of digital map images from the printed map, each image having a uniform format of the predetermined pixel area and an identifier of a reference point and size of a geographic area and a uniform shape that can be fitted adjacent to each other to form a seamless map comprised of a plurality of such images;

(c) providing a user input device for enabling a user to give input to the processor;

(d) connecting a global positioning system receiver to the processor for providing global positioning system data to the processor;

(e) displaying, on a display screen having a display area, said map images and information, wherein the processor displays on the display area of the display screen a display map image comprising at least a portion of at least one of said bit-mapped images, the display map image centered on any given longitude and latitude supplied to the processor, the display map image essentially filling the display area of the display screen with no discontinuities in the image over the entire said at least one map system except at any edges of said at least one map system, and (f) updating the bit-mapped map image whenever a new longitude and latitude is supplied to the processor.

2. The method of claim 1 wherein said new longitude and latitude are supplied to the processor by a selectable one of the global positioning system receiver and the user input device.

3. The method of claim 1 wherein the first data includes airport data including at least airport locations, names, and official identifiers.

4. The method of claim 3 further comprising storing second data from and providing second data to the processor, wherein the processor stores, as second data in response to user inputs, information on a first route including a first starting point, a first destination, and any first waypoints.

5. The method of claim 4 wherein any of (1) the first starting point, (2) the first destination point, and (3) the any first way points are supplied to the processor from the airport data in response to selection, of an airport as any of (1) the first starting point, (2) the first destination point, or (3) the any first waypoints, such selection being made by user inputs through the user input device.

6. The method of claim 4 wherein the processor stores, as part of said second data in response to said user inputs, information on a second route including at least a second starting point, a second destination, and any second waypoints.

7. The method of claim 6 wherein the processor selectively displays a current point and a next point of a selected route.

8. The method of claim 6 wherein the processor automatically reverses a selected route in response to a user input through the user input device.

9. The method of claim 6 wherein the routes constitute flight plans and wherein the processor uses input from the global positioning system receiver to track progress of the navigational system along a selected flight plan, and wherein the processor displays over a peripheral portion of the display area a flight plan information window containing information on a present leg and a next leg of the selected flight plan, the flight plan information window being selectively displayable according to user inputs through the user input device.

10. The method of claim 3 wherein said new longitude and latitude are supplied to the processor from the first computer storage medium and correspond to the location of a selected airport selected by user inputs through the user input device.

11. The method of claim 3 wherein the processor displays over a peripheral portion of the display area a navigation information window containing at least information, derived from the global positioning system receiver, on ground track, and, when available, on altitude, the navigation information window being selectively displayable according to user inputs through the user input device.

12. The method of claim 3 wherein the processor displays over a peripheral portion of the display area a nearest airport window containing at least the name, location, distance, and heading of the airport nearest to the navigation system, the nearest airport window being selectively displayable according to user inputs through the user input device.

13. The method of claim 3 wherein the processor displays over a peripheral portion of the display area a global positioning system receiver status window containing both information on the signal strengths of each global positioning system signal being tracked by the global positioning system receiver, and a tracking mode indicator indicating whether the global positioning system is in a two-dimensional or a three-dimensional tracking mode, the global positioning system receiver status window being selectively displayable according to user inputs through the user input device.

14. The method of claim 3 wherein the airport data includes information on runways, communications, navigational facilities, and services and supplies available.

15. The method of claim 1 wherein the first data includes standardized bit-mapped image data of at least two map systems of differing scale.

16. The method of claim 15 wherein one of the at least two map systems comprises world aeronautical charts.

17. The method of claim 15 wherein one of the at least two map systems comprises sectional aeronautical charts.

18. The method of claim 15 wherein the first data includes standardized bit-mapped image data of at least three maps of mutually differing scales.

19. A navigation system comprising: a processor;

a computer-readable storage medium including both bit-mapped map image data of at least one system of earth surface maps, and overlay data, readable by the processor;

a user input device for providing user input to the processor;

a display device connected to the processor for displaying images and information, the processor producing, from the bit-mapped map image data, and displaying on the display device, in response to any longitude and latitude supplied to the processor, a bit-mapped map image essentially filling the display area of the display device and having no discontinuities except at any edges of the map system, and centered at the supplied longitude and latitude, the processor displaying in response to user inputs an overlay accurately overlaid on and scaled to the bit-mapped map image, wherein the bit-mapped map image data comprises map image data produced by the process of (i) electronically scanning a printed map to create a stored bit-mapped map image corresponding to the printed map;

(ii) displaying the stored bit-mapped map image for editing;

(iii) cropping with image editing software the displayed bit-mapped map image into smaller images that are then deleted, moved, sized, and merged back into the displayed image to remove an unwanted part of the image and to select the remainder as a map image corresponding to a desired geographic area, the map image having discrete boundaries defined by reference grid lines;

(iv) moving the boundaries of the displayed map image with said image editing software to shape the geographic area into a predetermined rectangular shape;

(v) sizing the displayed map image with said image editing software after the image has been shaped to contain a predetermined pixel area;

(vi) permanently storing, in the computer-readable storage medium, the displayed map image as said bit-mapped map image of the printed map after the displayed image has been shaped and sized, the displayed map image being stored with an identifier of a reference point and size of the geographic area represented by the selected map image; and (vii) repeating (i)–(vi) to create a plurality of digital map images from the printed map, each image having a uniform format of the predetermined pixel area and an identifier of a reference point and size of a geographic area and a uniform shape that can be fitted adjacent to each other to form a seamless map comprised of a plurality of such images.

20. The navigation system of claim 19 wherein the navigation system further comprises a global positioning system receiver for providing global positioning information to the processor, and wherein the computer-readable storage medium includes airport identification and location data, and wherein the any longitude and latitude supplied to the processor is supplied from a selectable one of the user input device, the airport location data from the computer-readable storage medium, and the global positioning system receiver.

21. The navigation system of claim 19 wherein the bit-mapped map image is selectively dimmed according to a user input from the user input device while a simultaneously displayed overlay overlaid on and scaled to the bit-mapped map image remains undimmed.

22. The navigation system of claim 19 wherein the overlay comprises an airport approach plate.

23. The navigation system of claim 19 wherein the overlay comprises instrument flight rules route charts.

24. The navigation system of claim 19 wherein the bit-mapped map image data includes bit-mapped map image data of at least two systems of maps having mutually differing scales, the bit-mapped map image produced by the processor being formed from the bit-mapped map image data of a selectable one of any of the at least two systems of maps having mutually differing scales, the overlay displayed so as to be accurately overlaid on and scaled to the bit-mapped map image regardless of which of the at least two systems of maps is selected.

* * * * *